United States Patent Office 3,376,279
Patented Apr. 2, 1968

3,376,279
**PREVENTION OF COLD FLOW IN POLYBUTA-
DIENES BY THE ADDITION OF A HALO-
GENATED ALKENE TO THE POLYMERIZA-
TION MIXTURE AT THE COMPLETION OF
THE POLYMERIZATION**
Ollie G. Buck and Gerald R. Kahle, Bartlesville, Okla., assignors to Phillips Petroleum Company, a corporation of Delaware
No Drawing. Filed Nov. 2, 1964, Ser. No. 408,369
6 Claims. (Cl. 260—94.3)

ABSTRACT OF THE DISCLOSURE

High cis-polybutadiene having a reduced tendency to cold flow in the unvulcanized stage is made by polymerizing 1,3-butadiene with a catalyst formed by mixing at least an organometal compound and a component containing titanium and iodine wherein a halogen-containing alkene, containing at least two active halogen atoms attached to a carbon which is alpha to the doubly bonded carbon atom, is added to the polymerization mixture at the completion of the polymerization.

---

This invention relates to a method for preventing or substantially reducing the tendency of certain polybutadienes to cold flow. In one aspect this invention relates to a novel composition containing cis-polybutadiene and a treating agent which reduces the tendency of polybutadienes to cold flow.

A considerable amount of research work has been conducted during the last few years with the object of producing improved rubbery polymers. Polybutadiene containing a high percentage, e.g., at least 85 percent of cis-1,4 addition, has attracted widespread attention because of its superior properties. This polymer as such is particularly suited for the fabrication of automobile and truck tires and other articles for which conventional synthetic polymers and natural rubbers have heretofore been preferred. In the manufacture and processing of cis-polybutadiene certain difficulties have been encountered from its tendency to cold flow in the unvulcanized state. For example, in the event of cracks or punctures in a package, polymer flows therefrom, leading to product loss or contamination, sticking together of packages, and the like.

It is an object of this invention to provide a method for preventing or substantially reducing the tendency of cis-polybutadiene to cold flow.

Another object of this invenion is to provide an improved cis-polybutadiene that has reduced tendency to cold flow.

Other aspects, advantages, and objects of this invention will become apparent to those skilled in the art upon an examination of the accompanying disclosure and appended claims.

This invention is concerned with the production of improved polybutadiene products which have a reduced tendency to cold flow when in the unvulcanized state. The invention resides in an improvement in polybutadiene products prepared by polymerizing 1,3-butadiene with a conventional catalyst system that promotes cis-1,4 addition. The improvement comprises adding to the polymerization mixture an organic reactant material containing at least two active halogen atoms attached to carbon atoms which are in an alpha position to a double bond. The organic reactant material is added to the polymerization mixture before the catalyst is inactivated. After the organic reactant material has been thoroughly mixed with the polymerization mixture, the catalyst is inactivated by a conventional process. The resulting cis-polybutadiene retains its desirable physical properties and has an improved resistance to cold flow in the unvulcanized state.

The organic reactant materials that are used in the practice of this invention are halogen-containing alkenes that contain at least two active halogen atoms, i.e., at least two halogen atoms, that are attached to carbon atoms which are in an alph position to a doubly bonded carbon atom. The active halogen atoms can be attached to the same or different carbon atoms within the molecule. The compounds can have up to 20 carbon atoms per molecule or more, can be partially or completely halogenated, and can contain more than one double bond. The active halogen containing compounds can contain fluorine, chlorine, bromine, or iodine, or mixtures of these halogens. However, chlorine, bromine, and iodine are preferred, and more particularly, compounds containing chlorine. The halogen-containing compounds can contain various hydrocarbon substituents such as alkyl, cycloalkyl, aryl, aralkyl, and alkaryl groups. The active halogen containing compounds will be composed of carbon, hydrogen, and halogen atoms.

Specific active halogen containing compounds which can be employed in carrying out this invention include the following:

hexachloropropene
3,3-dibromo-1-chloro-1-propene
1,4-difluoro-2-butene
1,4-diiodo-2-pentene
1,4-dichloro-2-hexene
4,4-dichloro-2-heptene
1,1-dibromo-4-chloro-2-pentene
2,5,6,9-tetrachloro-3,7-decadiene
1,1,1,8,8,8-hexachloro-2,6-octadiene
2,5-dibromo-1,6-diphenyl-3-hexene
1,1,1,4,4-pentachloro-3-ethyl-2-pentene
1,4,7-triiodo-7-(4-tolyl)-2,5-heptadiene
4,6-dibromo-1,9-dichloro-4,6-diethyl-5-benzyl-2,7-nonadiene
1,1,4,4-tetrachloro-1,4-dicyclohexyl-2-butene
hexachlorocyclopentadiene
5,5-dichloro-2,3-di-n-propyl-1,3-cyclopentadiene
3,3,6,6-tetrabromo-1,4-cyclohexadiene
3,6-difluoro-1-cyclohexene
3,3,4,4-tetraiodo-7,8-diphenyl-1,5-cyclooctadiene
octachlorocyclopentene
4,4-dichloro-7,7-dibromo-5-pentadecene
1,1-dichloro-4,4-diiodo-2-eicosene and the like.

In carrying out the invention the active halogen containing compound is added either per se or as a solution to the unquenched polymer solution. By "unquenched polymer" is meant polymer which has not been treated with any type of reagent to inactivate the catalyst. Suitable solvents for the active halogen containing compound include materials which are employed as diluents in the preparation of the cis-polybutadiene. At the conclusion of the polymerization the treating agent is added and the mixture is agitated to facilitate contact of the reactants. The temperature can be adjusted as desired either before or after addition of the treating agent.

Reaction of the active halogen containing compound with the unquenched cis-polybutadiene solution can be carried out over a wide range of temperature. In general a suitable treating temperature is from about 20° F. to 250° F., preferably from about 60° F. to 175° F. The treating time will depend upon the temperature as well as upon the halogen containing compound which is used. It will generally be in the range of 5 minutes to 5 hours or longer.

The amount of active halogen containing compound employed for the reduction in cold flow of cis-polybutadiene is based on the organometal component in the catalyst. It will generally be in the range of 0.05 to 10 millimoles per mole of organometal compound.

The treating agent of this invention is applicable to the process for preparing a polybutadiene containing a high percentage of cis-1,4-addition. The cis-polybutadiene can be prepared by polymerizing butadiene with a catalyst system which is formed by mixing materials comprising an organometal compound and iodine, present either in the free or combined state. This type of polymerization system produces a cis-polybutadiene having outstanding physical properties when in the cured state but having a tendency to cold flow in the unvulcanized state when the treating agent is not added. The term "cis-polybutadiene" as used herein is intended to include a polybutadiene containing at least 85 percent cis-1,4-addition, e.g., from 85 to 98 percent and higher.

The cis-polybutadiene can be prepared by polymerizing 1,3-butadiene with any one of a large number of different stereospecific catalyst systems. Among the catalysts employed are those selected from the group consisting of (1) a catalyst formed by mixing materials comprising an organometal compound having the formula $R_mM$, wherein R is an alkyl, cycloalkyl, aryl, alkaryl, aralkyl, alkylcycloalkyl, cycloalkylalkyl, arylcycloalkyl or cycloalkylaryl radical, M is aluminum, mercury, zinc, beryllium, cadmium, magnesium, sodium or potassium, and $m$ is equal to the valence of the metal M, and titanium tetraiodide, (2) a catalyst formed by mixing materials comprising an organometal compound having the formula $R_nM'$, wherein R is an organo radical as defined above, M' is aluminum, magnesium, lead sodium or potassium, and $n$ is equal to the valence of the metal M', titanium tetrachloride and titanium tetraiodide, (3) a catalyst formed by mixing materials comprising an organometal compound having the formula $R_aM''$, wherein R is an organo radical as defined above, M'' is aluminum or magnesium and $a$ is equal to the valence of the metal M'', a compound having the formula $TiX_b$, wherein X is chlorine or bromine and $b$ is an integer from 2 to 4, inclusive, and elemental iodine or an organic iodide, (4) a catalyst formed by mixing materials comprising an organometal compound having the formula $R_xM'''$ wherein R is an organo radical as defined above, M''' is aluminum, gallium, indium or thallium, and $x$ is equal to the valence of the metal M''', a titanium halide having the formula $TiX_4$ wherein X is chlorine or bromine, and an inorganic halide having the formula $M^{iv}{}_cI_c$, wherein $M^{iv}$ is beryllium, zinc, cadmium, aluminum, gallium, indium, thallium, silicon, germanium, tin, lead, phosphorus, antimony, arsenic, and bismuth, and $c$ is an integer from 2 to 5, inclusive, and (5) a catalyst formed by mixing materials comprising an organo compound having the formula $R_xM'''$, wherein R, M''', and $x$ are as defined above, titanium tetraiodide, and an inorganic halide having the formula $M^vX_d$, wherein $M^v$ is aluminum, gallium, indium, thallium, germanium, tin, lead, phosphorus, antimony, arsenic or bismuth, X is chlorine or bromine, and $d$ is an integer from 2 to 5 inclusive. The R radicals of the aforementioned formulas preferably contain up to and including 20 carbon atoms.

The following are examples of preferred catalyst systems which can be used to polymerize 1,3-butadiene to a cis-1,4-polybutadiene:

triisobutylaluminum and titanium tetraiodide
triethylaluminum and titanium tetraiodide
triisobutylaluminum, titanium tetrachloride and titanium tetraiodide
diethylzinc and titanium tetraiodide
dibutylmercury and titanium tetraiodide
triisobutylaluminum, titanium tetrachloride and iodine
triethylaluminum, titanium tetrabromide and iodine
n-amylsodium and titanium tetraiodide
phenylsodium and titanium tetraiodide
n-butylpotassium and titanium tetraiodide
phenylpotassium and titanium tetraiodide
n-amylsodium, titanium tetrachloride and titanium tetraiodide
triphenylaluminum and titanium tetraiodide
triphenylaluminum, titanium tetraiodide and titanium tetrachloride
triphenylaluminum, titanium tetrachloride and iodine
tri-alpha-naphthylaluminum, titanium tetrachloride and iodine
tribenzylaluminum, titanium tetrabromide and iodine
diphenylzinc and titanium tetraiodide
di-2-tolylmercury and titanium tetraiodide
tricyclohexylaluminum, titanium tetrachloride and titanium tetraiodide
ethylcyclopentylzinc and titanium tetraiodide
tri(3-isobutylcyclohexyl)aluminum and titanium tetraiodide
tetraethyllead, titanium tetrachloride and titanium tetraiodide
trimethylphenyllead, titanium tetrachloride and titanium tetraiodide
diphenylmagnesium and titanium tetraiodide
di-n-propylmagnesium, titanium tetrachloride and titanium tetraiodide
dimethylmagnesium, titanium tetrachloride and iodine
diphenylmagnesium, titanium tetrabromide and iodine
methylethylmagnesium and titanium tetraiodide
dibutylberyllium and titanium tetraiodide
diethylcadmium and titanium tetraiodide
diisopropylcadmium and titanium tetraiodide
triisobutylaluminum, titanium tetrachloride, and 1,4-diiodo-2-butene
triethylaluminum, titanium tetrabromide and isobutyl iodide
di-n-propylmagnesium, titanium tetrachloride, and methyl iodide
triisobutylaluminum, titanium tetrachloride, and iodoform
triisobutylaluminum, titanium tetrachloride, and antimony triiodide
triisobutylaluminum, titanium tetrachloride and aluminum triiodide
triisobutylaluminum, titanium tetrabromide, and aluminum triiodide
triethylaluminum, titanium tetrachloride and phosphorus triiodide
tri-n-dodecylaluminum, titanium tetrachloride, and tin tetraiodide
triethylgallium, titanium tetrabromide, and aluminum triiodide
tri-n-butylaluminum, titanium tetrachloride, and antimony triiodide
tricyclopentylaluminum, titanium tetrachloride, and silicon tetraiodide
triphenylaluminum, titanium tetrachloride, and gallium triiodide
triisobutylaluminum, titanium tetraiodide and tin tetrachloride
triisobutylaluminum, titanium tetraiodide and antimony trichloride
triisobutylaluminum, titanium tetraiodide and aluminum trichloride
triisobutylaluminum, titanium tetraiodide, and tin tetrabromide
triethylgallium, titanium tetraiodide, and aluminum tribromide
triethylaluminum, titanium tetraiodide, and arsenic trichloride
tribenzylaluminum, titanium tetraiodide, and germanium tetrachloride The polymerization process for preparing cis-polybutadiene is generally carried out in the presence of a hydrocarbon diluent which is not deleterious to the catalyst system. Examples of suitable diluents include aromatic, paraffinic and cycloparaffinic hydrocarbons, it being understood that mixtures of these materials can also be used. Specific examples of hydrocarbon diluents include benzene, toluene, n-butane, isobutane, n-pentane, isooctane, n-dodecane, cyclopentane, cyclohexane, methylcyclohexane, and the like. It is often preferred to employ aromatic hydrocarbons as the diluent.

The amount of the catalyst employed in polymerizing 1,3-butadiene to a cis-polybutadiene can vary over a rather wide range. The amount of the organometal used in forming the catalyst composition is usually in the range of 0.75 to 20 moles per mole of the halogen-containing catalyst component, i.e., a metal halide with or without a second metal halide or elemental iodine. The mole ratio actually used in a polymerization will depend upon the particular components employed in the catalyst system. However, a preferred mole ratio is generally from 1:1 to 12:1 of the organometal compound to the halogen containing catalyst component. When using a catalyst comprising an organometal compound and more than one metal halide, e.g., titanium tetrachloride and titanium tetraiodide, titanium tetrachloride or tetrabromide and aluminum iodide, the mole ratio of the tetrachloride or tetrabromide to the iodide is usually in the range of 0.05:1 to 5:1. With a catalyst system comprising an organometal compound, a titanium chloride or bromide and elemental iodine, the mole ratio of titanium halide to iodide is generally in the range of 10:1 to 0.25:1, preferably 3:1 to 0.25:1. The concentration of the total catalyst composition, i.e., organometal and halogen containing catalyst component, is usually in the range of 0.01 to 10 weight percent, preferably in the range of 0.01 to 5 weight percent, based on the total amount of 1,3-butadiene charged to the reactor system.

The process for preparing cis-polybutadiene can be carried out at temperatures varying over a rather wide range, e.g., from −100 to 250° F. It is usually preferred to operate at a temperature in the range of −30 to 160° F. The polymerization reaction can be carried out under autogenous pressure or at any suitable pressure sufficient to maintain the reaction mixture substantially in the liquid phase. The pressure will thus depend upon the particular diluent employed and the temperature at which the polymerization is conducted. However, higher pressures can be employed if desired, these pressures being obtained by some such suitable method as the pressurization of the reactor with a gas which is inert with respect to the polymerization reaction.

Various materials are known to be detrimental to the catalyst employed in preparing the cis-polybutadiene. These materials include carbon dioxide, oxygen and water. It is usually desirable, therefore, that the butadiene and diluent be freed of these materials as well as other materials which may tend to deactivate the catalyst. Furthermore, it is desirable to remove air and moisture from the reaction vessel in which the polymerization is to be conducted.

Upon the completion of the polymerization reaction, the organic reactant material containing at least two active halogen atoms attached to carbon atoms which are alpha to a doubly bonded carbon atom is added to the polymerization mixture. The mixture is then thoroughly agitated to insure contact of the reactants. Upon completion of this step the reaction mixture is then treated to inactivate the catalyst and recover the polymer. The inactivation step can be any known in the art. One suitable method for inactivating the catalyst material is by the addition of an alcohol. The alcohol is added to the polymerization mixture to inactivate the catalyst and cause coagulation of the polymer. The polymer is then separated from the alchol and diluent by any means, such as decantation or filtration. It has been found to be advantageous to add an antioxidant, such as phenyl-beta-napthylamine, 2,2′-methylene-bis(4-methyl-6-tert-butylphenol), etc., to the polymer solution prior to the recovery of the polymer. In order to more thoroughly understand the invention, the following example sets forth two preferred embodiments.

EXAMPLE

The following recipe was employed for the production of cis-polybutadiene:

| | |
|---|---|
| Toluene, parts by weight | 1000 |
| 1,3-butadiene, parts by weight | 100 |
| Triisobutylaluminum, mhm.[1] | 3.76 |
| Iodine, mhm.[1] | 0.9 |
| Titanium tetrachloride mhm.[1] | 0.447 |
| Temperature, ° F. | 41 |
| Time, hours | 3 |

[1] Millimoles per 100 grams 1,3-butadiene.

Toluene was charged first, the reactor was purged with nitrogen, butadiene was added, and then the triisobutylaluminum, iodine, and titanium tetrachloride. A series of five runs was made. After a 3-hour polymerization period, each of two runs was treated with two millimoles of a different halogenated organic reactant compound, one with hexachlorocyclopentadiene and the other with hexachloropropene. One run was reserved as a control, i.e., no halogenated organic reactant compound was added. All three polymerization mixtures were then heated to 70° C. (158° F.) and agitated at this temperature for 15 minutes. Hexachlorocyclopentadiene and hexachloropropane were added in amounts of two millimoles each to two other runs and the mixtures agitated 30 minutes while the temperature was maintained at 41° F. An isopropyl alcohol solution of 2,2′-methylene-bis(4 - methyl -6 - tert-butylphenol) was added to each run in an amount sufficient to provide approximately one part by weight of the anitoxidant per 100 parts by weight rubber. The polymers were coagulated in isopropyl alcohol, separated, and dried, and cold flow determined. Results were as follows:

| Run No. | Polymer Treatment | | | Monomer Conv., Percent[1] | Cold Flow, mg./min.[2] |
|---|---|---|---|---|---|
| | Halogenated Organic Reactant Compound | Temp., ° F. | Treating Time, min. | | |
| 1 | None | 158 | 15 | 88.3 | 8.31 |
| 2 | Hexachlorocyclopentadiene | 158 | 15 | 81.6 | 2.96 |
| 3 | Hexachloropropene | 158 | 15 | 78.3 | 0.00 |
| 4 | Hexachlorocyclopentadiene | 41 | 30 | 84.2 | 4.97 |
| 5 | Hexachloropropene | 41 | 30 | 90.3 | 2.13 |

[1] Calculated from weight of recovered product.
[2] Cold flow was measured by extruding the rubber through a ¼ inch orifice at 3.5 p.s.i. pressure at a temperature of 50° C. (122° F.). After allowing 10 minutes to reach steady state, the rate of extrusion was measured and reported in milligrams per minute.

These data show that both halogen containing compounds substantially reduced the cold flow of cis-polybutadiene.

Many variations and modifications of the invention can be practiced in view of the foregoing disclosure. It is to be understood that all matter herein set forth is to be interpreted as illustrative and not as unduly limiting the scope and spirit of the invention.

We claim:
1. In a process wherein a polymerization reaction mixture is formed by polymerizing 1,3-butadiene in the presence of an initiator obtained by mixing at least an organometal compound as a first component and a second component containing titanium and iodine the improvement which comprises adding to said reaction mixture, at the conclusion of the polymerization, a halogen-containing alkene containing at least two active halogen atoms attached to carbon atoms which are alpha to a doubly bonded carbon atom, and being otherwise inert to said initiator, and recovering a polybutadiene product having a high percentage of cis-1,4 addition and a reduced tendency to cold flow in the unvulcanized state.

2. In a process wherein a polymerization reaction mixture is formed by polymerizing 1,3-butadiene in the presence of a hydrocarbon diluent and an initiator formed by mixing at least an organometal compound as a first component and a second component containing titanium and iodine, said polymerization occuring at a temperature in the range of −100° to 250° F. and at a pressure sufficient to maintain said reaction mixture substantially in the liquid phase, the improvement which comprises adding to said reaction mixture, at the conclusion of the polymerization, a halogen-containing alkene containing at least two active halogen atoms attached to carbon atoms which are alpha to a doubly bonded carbon atom, and being otherwise inert to said initiator, said halogen-containing alkene being added to said polymerization mixture at a temperature in the range of 20 to 250° F., contacting said halogen-containing alkene and said polymerization mixture for a period of 5 minutes to 5 hours and recovering a polybutadiene product having a high percentage of cis-1,4 addition and a reduced tendency to cold flow in the unvulcanized state.

3. In a process wherein a polymerization reaction mixture is formed by polymerizing 1,3-butadiene in the presence of an initiator obtained by mixing triisobutylaluminum, iodine and titanium tetrachloride, the improvement which comprises adding to said reaction mixture, at the conclusion of the polymerization a halogen-containing alkene having up to 20 carbon atoms per molecule and containing at least two active halogen atoms attached to carbon atoms which are alpha to a doubly bonded carbon atom, and being otherwise inert to said initiator, and recovery a polybutadiene product having a reduced tendency to cold flow in the unvulcanized state.

4. In a process wherein a polymerization reaction mixture is formed by polymerizing 1,3-butadiene in the presence of an initiator obtained by mixing triisobutylaluminum, iodine and titanium tetrachloride, said polymerization occurring at a temperature in the range of −100 to 250° F. and at a pressure sufficient to maintain said reaction mixture substantially in the liquid phase, the improvement which comprises adding to said reaction mixture, at the conclusion of the polymerization, a halogen-containing alkene having up to 20 carbon atoms per molecule and containing at least two active halogen atoms attached to carbon atoms which are alpha to a doubly bonded carbon atom, and being otherwise inert to said initiator, said halogen-containing alkene being added to said polymerization mixture at a temperature in the range of 20 to 250° F., contacting said halogen containing alkene and said polymerization mixture for a period of 5 minutes to 5 hours and recovering a polybutadiene product having a reduced tendency to cold flow in the unvulcanized state.

5. The process of claim 4 wherein said halogen-containing alkene is hexachloropropene.

6. The process of claim 4 wherein said halogen-containing alkene is hexachlorocyclopentadiene.

References Cited

UNITED STATES PATENTS

| | | | |
|---|---|---|---|
| 2,802,806 | 8/1957 | Doak | 260—41.5 |
| 3,078,254 | 2/1963 | Zelinski et al. | 260—45.5 |
| 3,213,075 | 10/1965 | Sonnenfeld | 260—94.7 |

JOSEPH L. SCHOFER, *Primary Examiner.*

R. A. GAITHER, *Assistant Examiner.*